UNITED STATES PATENT OFFICE.

JOSEPH FLACHSLAENDER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

SULFUR DYE.

935,009.

No Drawing.

Specification of Letters Patent. Patented Sept. 28, 1909.

Application filed July 1, 1909. Serial No. 505,401.

*To all whom it may concern:*

Be it known that I, JOSEPH FLACHSLAENDER, doctor of philosophy, chemist, citizen of the German Empire, residing at Elberfeld, Germany, have invented new and useful Improvements in new Sulfur Dye, of which the following is a specification.

I have found that a new and valuable black sulfur dye can be obtained by treating dinitrochlorophenol having the formula:

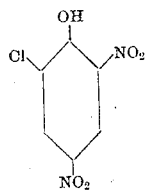

with alkaline polysulfids and subsequently precipitating the dye by means of acids, air or the like. The new coloring matter is distinguished by its beautiful bloomy deep black shade. It is obtained with a very good yield.

Example: 218 parts of dinitrochlorophenol ($OH:NO_2:NO_2:Cl=1:2:4:6$) are introduced into an alkaline polysulfid solution prepared from 628 parts of crystallized sodium sulfid and 138 parts of sulfur which alkaline polysulfid solution is heated to 110° C. The whole is thereupon heated to 115° C. for about 16 hours. The dyestuff is precipitated with air. It is after being dried and pulverized a black powder which is insoluble in water and in concentrated sulfuric acid (66° Bé.). It is easily soluble in solutions of sodium sulfid with a bluish-green color, and dyes unmordanted cotton black shades from a bath containing sodium sulfid and salt. It is soluble in caustic soda lye (30° Bé.) with a blue color.

I claim:

The herein before described new sulfur dye obtainable from dinitrochlorophenol ($OH:NO_2:NO_2:Cl=1:2:4:6$), which is after being dried and pulverized a black powder, insoluble in water and in concentrated sulfuric acid, soluble in caustic soda lye (30° Bé.) with a blue color; easily soluble in solutions of sodium sulfid with a bluish-green color and dyeing unmordanted cotton black shades, substantially as described.

In testimony whereof I have hereunto set my hand in the presence of two subscribing witnesses.

JOSEPH FLACHSLAENDER. [L. S.]

Witnesses:
 OTTO KÖNIG,
 WILLY KLEIN.